United States Patent
Nozawa

(10) Patent No.: US 8,803,827 B2
(45) Date of Patent: Aug. 12, 2014

(54) TOUCH PANEL AND DISPLAY APPARATUS PROVIDED WITH SAME

(75) Inventor: Junichi Nozawa, Kirishima (JP)

(73) Assignee: Kyocera Corporation, Kyoto (JP)

( * ) Notice: Subject to any disclaimer, the term of this patent is extended or adjusted under 35 U.S.C. 154(b) by 78 days.

(21) Appl. No.: 13/319,508

(22) PCT Filed: Apr. 20, 2010

(86) PCT No.: PCT/JP2010/056989
§ 371 (c)(1),
(2), (4) Date: Nov. 8, 2011

(87) PCT Pub. No.: WO2010/131551
PCT Pub. Date: Nov. 18, 2010

(65) Prior Publication Data
US 2012/0050201 A1    Mar. 1, 2012

(30) Foreign Application Priority Data

May 11, 2009  (JP) ................................. 2009-114237
Jun. 26, 2009  (JP) ................................. 2009-152595

(51) Int. Cl.
*G06F 3/041*  (2006.01)
*G06F 3/045*  (2006.01)
*G02F 1/1333*  (2006.01)
*G02F 1/1335*  (2006.01)

(52) U.S. Cl.
CPC ............ *G06F 3/045* (2013.01); *G02F 1/13338* (2013.01); *G02F 1/133615* (2013.01)
USPC .......................................... 345/173; 345/174

(58) Field of Classification Search
USPC ................................. 345/173–182
See application file for complete search history.

(56) References Cited

U.S. PATENT DOCUMENTS

2001/0043291 A1* 11/2001 Kono et al. ...................... 349/12
2005/0126831 A1* 6/2005 Richter et al. ............. 178/18.01
(Continued)

FOREIGN PATENT DOCUMENTS

| CA | 2687644 A1 | 11/2008 |
|---|---|---|
| CN | 1325054 A | 12/2001 |

(Continued)

OTHER PUBLICATIONS

Japanese language office action dated Nov. 6, 2012 and its English language translation issued in corresponding Japanese application 2010541359 cites the foreign patent document.

(Continued)

*Primary Examiner* — Kevin M Nguyen
*Assistant Examiner* — Kenneth B Lee, Jr.
(74) *Attorney, Agent, or Firm* — DLA Piper LLP (US)

(57) ABSTRACT

According to one aspect of the present invention, a touch panel includes: a first base including a first detection electrode and being transparent to light; a second base including a second detection electrode that oppose the first detection electrode, and being transparent to light; a first wiring electrically connected to the first detection electrode; and a second wiring electrically connected to the second detection electrode. The first wiring includes: a first wiring electrode provided on the first base; and a first auxiliary electrode provided on the second base so as to oppose the first wiring electrode. The first wiring electrode and the first auxiliary electrode are electrically connected to each other via a conductive adhesive member.

14 Claims, 6 Drawing Sheets

(56) References Cited

U.S. PATENT DOCUMENTS

| | | |
|---|---|---|
| 2008/0079697 A1 | 4/2008 | Lee et al. |
| 2010/0053854 A1* | 3/2010 | Nishikawa et al. ...... 361/679.01 |
| 2010/0201640 A1 | 8/2010 | Nozawa et al. |

FOREIGN PATENT DOCUMENTS

| | | |
|---|---|---|
| CN | 1918538 A | 2/2007 |
| JP | 09017276 A | 1/1997 |
| JP | 2002-041231 | 2/2002 |
| JP | 2002-207571 | 7/2002 |
| JP | 2003-196030 | 7/2003 |
| JP | 2010-066856 | 3/2010 |
| JP | 2010066856 A | 3/2010 |
| WO | 2009028653 A1 | 3/2009 |

OTHER PUBLICATIONS

Chinese language office action dated Oct. 29, 2013 and its Concise Explanation and English language translation issued in corresponding Chinese application 201080019706.2.

Extended European search report dated Dec. 2, 2013 issued in corresponding European application 10774809.7.

* cited by examiner

TOUCH PANEL AND DISPLAY APPARATUS PROVIDED WITH SAME

CROSS-REFERENCE TO THE RELATED APPLICATIONS

This application is national stage application of International Application No. PCT/JP2010/056989, filed Apr. 20, 2010, which designates the United States, incorporated herein by reference, and which claims the benefit of priority from Japanese Patent Application No. 2009-114237, filed on May 11, 2009 and from Japanese Patent Application No. 2009-152595, filed on Jun. 26, 2009, the entire contents of which are incorporated herein by reference.

TECHNICAL FIELD

The present invention relates to a touch panel arranged on a display screen and into which a user can input information by pressing it via his/her finger, a pen, or the like, and a display apparatus provided with the same.

BACKGROUND ART

A touch panel that detects an input coordinate through a change in a resistance due to a pressing operation has been known as an input device (e.g., see Patent Document 1).

The touch panel described above has a configuration in which a second base that is made of a PET (polyethylene terephthalate) film is arranged on a first base made of a glass so as to oppose the first base. The first base is provided with a first detection electrode made of an ITO on its inner surface (surface opposite the second base). The second base is provided with a second detection electrode made of an ITO on its inner surface (surface opposite to the first base). The first base is provided, on its inner surface, with a first wiring for applying a voltage to the first detection electrode, and a second wiring for applying a voltage to the second detection electrode. The second wiring is electrically connected to the second detection electrode through a conductive adhesive material.

In the touch panel, it is necessary to suppress the resistance of at least one of the first wiring and the second wiring to a certain extent in order to reduce variation in the applied voltage caused due to the large wiring resistance. Therefore, in the conventional touch panel described above, the width of the wiring has to be increased to a certain extent. Accordingly, the conventional touch panel cannot be made compact.

Patent Document 1: Japanese Patent Application Laid-open No. 2002-41231

SUMMARY OF THE INVENTION

The present invention is accomplished in view of the above-mentioned problem, and aims to provide a touch panel that can be made compact with a resistance of a wiring being reduced to a certain extent, and a display apparatus provided with the same.

A touch panel according to one aspect of the present invention comprises: a first base including a first detection electrode and being transparent to light; a second base including a second detection electrode that oppose the first detection electrode, and being transparent to light; a first wiring electrically connected to the first detection electrode; and a second wiring electrically connected to the second detection electrode, wherein the first wiring includes: a first wiring electrode provided on the first base; and a first auxiliary electrode provided on the second base so as to oppose the first wiring electrode, and wherein the first wiring electrode and the first auxiliary electrode are electrically connected to each other via a conductive adhesive member.

EMBODIMENT(S) FOR CARRYING OUT THE INVENTION

Figure 1:
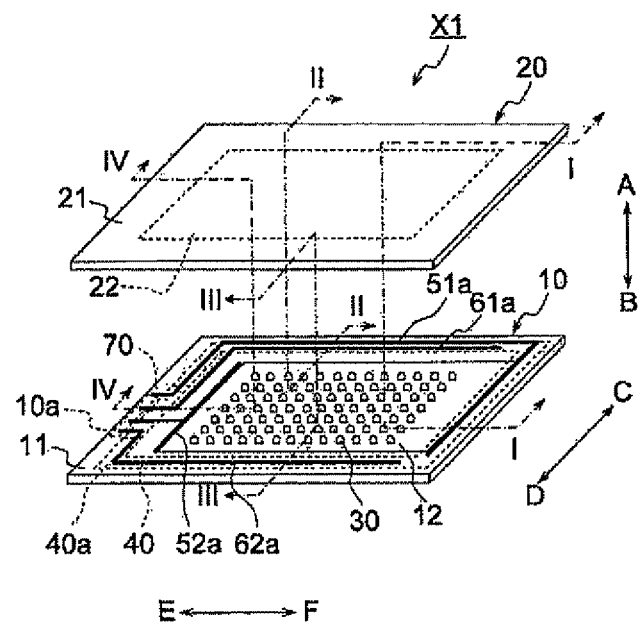
FIG. 1 is an exploded perspective view illustrating one example of a touch panel according to a first embodiment of the present invention.

Embodiments of the present invention will be described below with reference to the drawings.

For the sake of convenience of description, the drawings referred to below illustrate, in a simplified manner, only main components necessary for the description of the present invention, among components of embodiments of the present invention. Accordingly, a touch panel and a display apparatus according to the present invention can be provided with any components that are not illustrated in the drawings referred to in the present specification. A size of each member it each drawing does not precisely indicates a site of an actual component and a dimension ratio of each component.

First Embodiment

As illustrated in FIGS. 1 to 7, a touch panel X1 according to a present embodiment is a resistive touch panel, and includes a first base 10 and a second base 20. The second base 20 will be described, below before the first base 10 is described.

The second base 20 includes a second insulating base 21 and a second detection electrode 22. The second base 20 is transparent to light, and has flexibility. In the present embodiment, transparent to light means permeable to visible light. In the present embodiment, the second base 20 has a substantially rectangular shape as viewed in a plane, but it is not limited thereto.

The second insulating base 21 has a function of supporting the second detection electrode 22. The second insulating base 21 is configured to be capable of suitably transmitting light in a direction (e.g., a direction of an arrow AB in FIG. 1) crossing its major surface, and is also configured to have sufficient electrical insulating property. Examples of a material for the second insulating base 21 include a material transparent to light, such as a glass or plastic. Here, glass is preferred, from the viewpoint of high quality.

The second detection electrode 22 contributes to a detection of a potential at a contact point with respect to a first detection electrode 12 of the first base 10 described later, and it is configured to transmit light which is incident from one side (from below in the present embodiment), to the other side (upward in the present embodiment). A conductive member that is transparent to light is used as a material for the second detection electrode 22. Examples of the conductive material that is transparent to light include such as ITO (Indium Tin Oxide), ATO (Antimony Tin Oxide), tin oxide, or zinc oxide. In the present embodiment, the second detection electrode 22 is formed on the major surface (lower surface) of the second insulating base 21.

The first base 10 includes a first insulating base 11 and a first detection electrode 12. The first base 10 is transparent to light. The first base 10 is arranged opposite the second base 20. At a portion of the first base 10, there is provided an external conductive region 10a that it a region electrically connected to an FPC (Flexible Printed Circuit) not illustrated or the like. In the present embodiment, the first base 10 has a substantially rectangular shape as viewed in a plane, but it is not limited thereto.

The first insulating base 11 has a function of supporting the first detection electrode 12. The first insulating base 11 is configured to be capable of suitably transmitting light in the direction (e.g., the direction of the arrow AB in FIG. 1) crossing its major surface, and is also configured to have sufficient electrical insulating property. Examples of a material for the first insulating base 11 include a material transparent to light, such as a glass or plastic. Here, glass is preferred from the viewpoint of high quality.

The first detection electrode 12 contributes to a detection of a potential at a contact point of the second detection electrode 22 of the second base 20, and it is configured to transmit light which is incident from one side (from below in the present embodiment), to the other side (upward in the present embodiment). The material the same as that of the second detection electrode 22 can be used for the first detection electrode 12 in the present embodiment, the first detection electrode 12 is formed on the major surface (upper surface) of the first insulating base 11, and a region where the first detection electrode 12 is formed is within the region where the second detection electrode 22 is formed as viewed in a plane as illustrated in FIG. 1.

A spacer 30, a conductive adhesive member 40, first wiring electrodes 51a and 52a, and second wiring electrodes 61a and 62a are provided on the first base 10. In the present embodiment, the spacer 30 is provided only on the first detection electrode 12 of the first base 10. However, it is not limited thereto. The spacer 30 may be provided on the first detection electrode 12 of the first base 10, and on the first insulating base 11 around the first detection electrode 12.

The spacer 30 has a function such that, when the first detection electrode 12 and the second detection electrode 22 are brought into contact with each other at a predetermined position (when information is input), an occurrence of an unnecessary contact between the first detection electrode 12 and the second detection electrode 22 at a portion other than the predetermined position is reduced. The spacer 30 is configured by a plurality of dot spacers. Examples of the material for the spacer 30 include a thermosetting resin or ultraviolet curable resin, and the thermosetting resin is preferable from the viewpoint of environment resistance while the ultraviolet curable resin is preferable from the viewpoint of production efficiency. Examples of the thermosetting resin include epoxy resins, unsaturated polyester resins, urea resins, melanine resins, or phenolic resins. Examples of the ultraviolet curable resins include acrylic resins or epoxy resins.

The dot spacers are arranged on the first detection electrode 12 in a matrix at substantially equal intervals. It is preferable that the dot spacer is configured to sufficiently reduce the occurrence of the unnecessary contact between the first detection electrode 12 and the second detection electrode 22 while difficult to be visually recognize. The spacer described above can be formed with a screen printing process, offset printing process, and photolithography process using the ultraviolet curable resin such as acrylic resins or epoxy resins, or the thermosetting resin.

The conductive adhesive member 40 is arranged on the first base 10 so as to surround the first detection electrode 12 as viewed in a plane. The conductive adhesive member 40 contains conductive particles 41 and an adhesive material 42. The conductive particle 41 contains a plastic ball and a conductive material (e.g., gold or nickel) that covers the surface of the plastic ball. Examples of an adhesive member 42 include a thermosetting resin. The conductive adhesive member 40 has a function of bonding the first base 10 and the second base 20 while the electrical conduction among the second detection electrode 22, later-described second wiring electrodes 61a and 62a, and second auxiliary electrodes 61b and 62b is established.

The first wiring electrodes 51a and 52a serving as a first wiring are electrically connected to the first detection electrode 12 of the first base 10. Specifically, the first wiring electrodes 51a and 52a have a function of applying a voltage to the first detection electrode 12. One end of the first wiring electrode 51a is located at an end region, in a direction of an arrow D, of a region 40a (hereinafter referred to as "bonding region 40a") where the conductive adhesive member 40 is formed, while the other end thereof is located on an external conductive region 10a of the first base 10. One end of the first wiring electrode 52a is located at end regions of the bonding region 40a in the direction of the arrow C and the direction in the arrow D, while the other end thereof is located on the external conductive region 10a of the first base 10.

Figure 3:
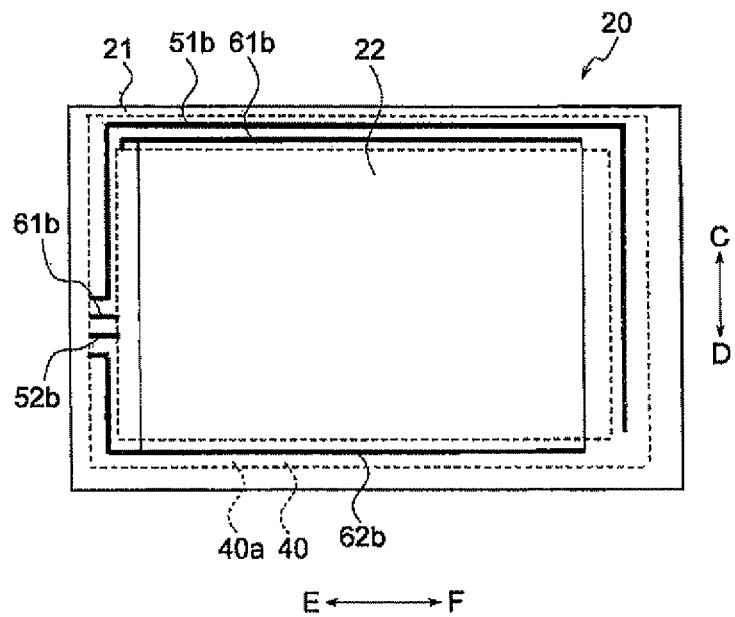
FIG. 3 is a plane view illustrating a schematic configuration of a second base as viewed from the arrow B direction toward the arrow A direction in FIG. 1.
Figure 4:
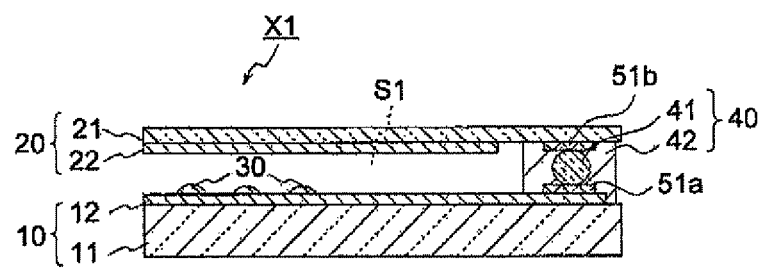
FIG. 4 is a sectional view taken along a cut line I-I in FIG. 1.
Figure 5:
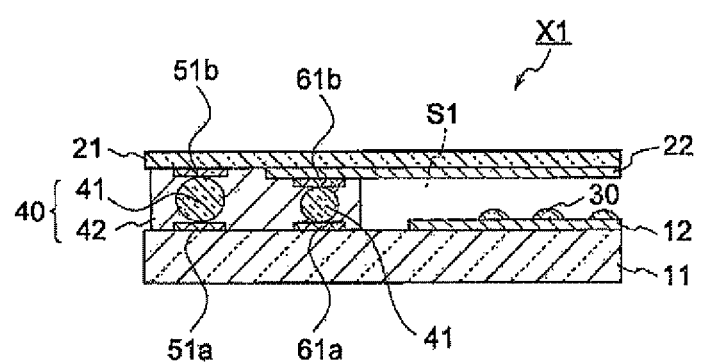
FIG. 5 is a sectional view taken along a cut line II-II in FIG. 1.

As illustrated in FIGS. 3 to 5, the second base 20 is provided with a first auxiliary electrode 51b, serving as the first wiring, at the portion opposite the first wiring electrode 51a. Specifically, the first auxiliary electrode 51b is provided on the second insulating base 21 of the second base 20, and is not electrically connected to the second detection electrode 22. The first auxiliary electrode 51b is electrically connected to the first wiring electrode 51a via the conductive adhesive member 40. In the bonding region 40a, the first auxiliary electrode 51b is preferably provided over the entire first wiring electrode 51a located in the bonding region 40a. The reason for this will be described later.

As illustrated in FIG. 3, the second base, 20 is provided with the first auxiliary electrode 52b serving as the first wiring at the portion opposite the first wiring electrode 52a. Specifically, the first auxiliary electrode 52b is provided on the second insulating base 21 of the second base 20, and is not electrically connected to the second detection electrode 22. The first auxiliary electrode 52b is electrically connected to the first wiring electrode 52a via the conductive adhesive member 40. In the bonding region 40a, the first auxiliary electrode 52b is preferably provided along the entire first wiring electrode 52a located in the bonding region 40a.

As described above, in the touch panel X1 according to the present embodiment, the first wiring electrodes 51a and 52a provided on the first base 10 and the first auxiliary wirings 51b and 52b provided on the second base 20 so as to oppose the first wiring electrodes 51a and 52a are electrically connected with each other through the conductive adhesive member 40. Therefore, the touch panel X1 can decrease the width of the first wiring electrodes 51a and 52a to a certain extent, while reducing the resistance of the first wiring electrodes 51a and 52a to a certain extent, as compared to the conventional touch panel. In the present embodiment, in particular, the first auxiliary electrodes 51b and 52b are provided in the bonding region 40a along the entire first wiring electrodes 51a and 52a located in the bonding region 40a. Therefore, the resistance can be reduced over the entire first wiring electrodes 51a and 52a.

Specifically, since the first auxiliary electrode is not mounted in the conventional touch panel, the width of the first wiring electrode has to be increased to a certain extent in order to reduce the resistance of the first wiring electrode to a certain extent. In other word, the touch panel X1 can be made compact while reducing the resistance of the first wiring electrode to a certain extent, as compared to the conventional touch panel.

The second wiring electrodes 61a and 62a serving as a second wiring are electrically connected to the second detection electrode 22 of the second base 20 through the conductive adhesive member 40. Specifically, the second wiring electrodes 61a and 62a have a function of applying a voltage to the second detection electrode 22. One end of the second wiring electrode 61a is located at the end region of the bonding region 40a in a direction of an arrow F, while the ether and thereof is located on the external conductive region 104 of the first base 10. One end of the second wiring electrode 62a is located at the end region of the bonding region 40a in the direction of the arrow F, while the other end thereof is located on the external conductive region 10a of the first base 10.

As illustrated in FIGS. 3 and 5, the second base 20 is provided with a second auxiliary electrode 61b, serving as the second wiring, at the portion opposite the second wiring electrode 61a. Specifically, a portion of the second auxiliary electrode 61b is provided on the second detection electrode 22 of the second base 20, and is electrically connected to the second detection electrode 22. The second auxiliary electrode 61b is electrically connected to the second wiring electrode 61a via the conductive adhesive member 40. In the bonding region 40a, the secured auxiliary electrode 61b is preferably provided along the entire second wiring electrode 61a located in the bending region 40a.

Figure 6:
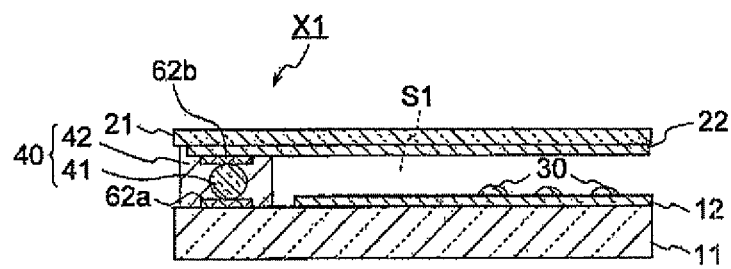
FIG. 6 is a sectional view taken along a cut line III-III in FIG. 1.

As illustrated in FIGS. 3 and 6, the second base 20 is provided with a second auxiliary electrode 62b, serving as the second wiring, at the portion opposite the second wiring electrode 62a. Specifically, a portion of the second auxiliary electrode 62b is provided on the second detection electrode 22 of the second base 20, and is electrically connected to the second detection electrode 22. The second auxiliary electrode 62b is electrically connected to the second wiring electrode 62a via the conductive adhesive member 40. In the bonding region 40a, the second auxiliary electrode 62b is preferably provided along the entire second wiring electrode 62a located in the bonding region 40a.

As described above, in the touch panel X1 according to the present embodiment, the second wiring electrodes 61a and 62a provided on the first base 10 and the second auxiliary wirings 61b and 62b provided on the second base 20 so as to oppose the second wiring electrodes 61a and 62a are electrically connected with each other through the conductive adhesive member 40. Therefore, the touch panel X1 can decrease the width of the second wiring electrodes 61e and 62a to a certain extent, while reducing the resistance of the second wiring electrodes 61a and 62a to a certain extent, as compared to the conventional touch panel. In the present embodiment, in particular, the second auxiliary electrodes 61b and 62b are provided in the bending region 40a along the entire second wiring electrodes 61a and 62a located in the bonding region 40a. Therefore, the resistance can be reduced all over the second wiring electrodes 61a and 62a.

Specifically, since the second auxiliary electrode is not mounted in the conventional touch panel, the width of the second wiring electrode has to be increased to a certain extent in order to reduce the resistance of the second wiring electrode, to a certain extent. In other word, as compared to the conventional touch panel, the touch panel X1 can be made compact, while reducing the resistance of the second wiring electrode to a certain extent.

Although the first auxiliary electrodes 51b and 52b and the second auxiliary electrodes 61b and 62b are formed on the second base 20 in the above-mentioned embodiment, it is not limited thereto. Thus, either one set of the first auxiliary electrodes 51b and 52b and the second auxiliary electrodes 61b and 62b may be provided on the second base 20. When the first auxiliary electrodes 51b and 52b, and the second auxiliary electrodes 61b and 62b are both provided on the second base 20 as in the present embodiment, the resistances of the first wiring electrodes 51a and 52a and the second wiring electrodes 61a and 62a can be reduced, thus preferable.

In the present embodiment, the first wiring electrodes 51a and 52a, the second wiring electrodes 61a and 62a, the first auxiliary electrodes 51b and 52b, and the second auxiliary electrodes 61b and 62b are made of a thin metal film, for example, in order to have rigidity and a high shape stability. For example, the thin metal film may be an aluminum film, an aluminum alloy film, a laminated film of a chrome film and an aluminum film, or a laminated film of a chrome film and an aluminum alloy film. Examples of the above-mentioned thin film-forming process include a sputtering process, vapor deposition process, and a chemical vapor deposition (CVD) process.

It is preferable that the first auxiliary electrodes 51b and 52b are made of the material same as that of the first wiring electrodes 51a and 52a. If the first auxiliary electrodes 51b and 52b are made of the material same as that of the first wiring electrodes 51a and 52a, the resistivity of the first auxiliary electrodes 51b and 52b and the resistivity of the first wiring electrodes 51a and 52a are substantially equal to each other. In order to make the resistivity of the first auxiliary electrodes 51b and 52b and the resistivity of the first wiring electrodes 51a and 52a further equal to each other, it is preferable that the thickness of the first auxiliary electrodes 51b and 52b and the thickness of the first wiring electrodes 51a and 52a are set to be substantially equal to each other. With this, the resistivity can be reduced in a well-balanced manner by the first wiring electrodes 51a and 52a and the first auxiliary electrodes 51b and 52b. With the similar reason, the second auxiliary electrodes 61b and 62b are also preferred to be made of a material same as that of the second wiring electrodes 61a and 62a.

A sealing member 70 is provided in the vicinity of the external conductive region 10a of the first base 10. The sealing member 70 has a function of sealing an internal space S1 of the touch panel X1 together with the conductive adhesive member 40, the first base 10, and the second base 20. The internal space S1 has a predetermined internal pressure by filling air therein in order to keep a separated state of the first base 10 and the second base 20. The predetermined internal pressure is a pressure larger than the atmospheric pressure, for example. Specifically, air or the like is injected into the internal space S1 from an opening formed by the first base 10 and the second base 20 before the sealing member 70 is provided, whereby the internal pressure is set to be the predetermined pressure. Thereafter, the opening is sealed by the sealing member 70, whereby the touch panel X1 is composed.

Figure 7:
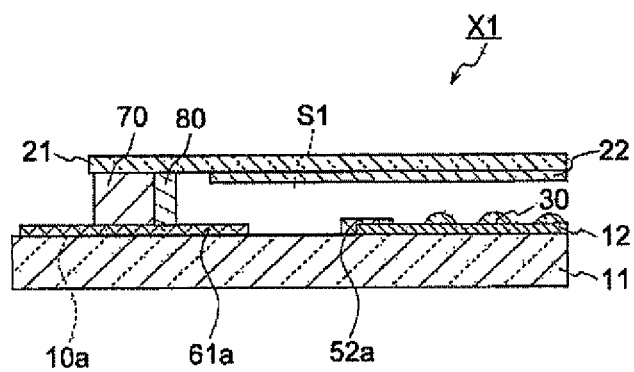
FIG. 7 is a sectional view taken along a cut line IV-IV in FIG. 1.

As illustrated in FIG. 7, a support member 80 is preferably provided near the sealing member 70. With this structure, the deformation of the second base 20 facing the first base 10 can be suppressed. That is to say, this structure can suppress the occurrence of a concentric interference pattern (Newton ring based upon light interference, which is caused by the deformation of the second base 20 facing the first base 10. The support member 80 may be provided at the portion other than the portion near the sealing member 70.

Next, one example of a bonding method of the first base 10 and the second base 20 by the conductive adhesive member 40 will be described.

Firstly, the conductive adhesive member 40 is applied on the bonding region 40a on the upper surface of the first base 10. In the present embodiment, the bonding region 40a is the region surrounding the first detection electrode 12 as is well illustrated in FIGS. 1 and 2.

The second base 20 is positioned with respect to the first base 10 having the conductive adhesive member 40 applied thereon, and then, the first base 10 and the second base 20 are bonded through the conductive adhesive member 40 to form a bonded structure.

The first base 10 and the second base 20 in the formed structure are pressed in the direction in which they are made close to each other. In the present embodiment, the first base 10 and the second base 20 are pressed in such a manner that the conductive particle 41 is deformed by the first base 10 and the second base 20 until the conductive particle 41 is brought into contact with both of the first base 10 and the second base 20, while the elastic deformation amount or aspect ratio of the conductive particle 41 is increased.

Finally, the conductive adhesive member 40 is heated up to a curing temperature of the adhesive material 42 with the predetermined pressure sate being maintained.

As described above, the first base 10 and the second base 20 are bonded to each other, and the touch panel X1 according to the present embodiment is manufactured.

Figure 8:
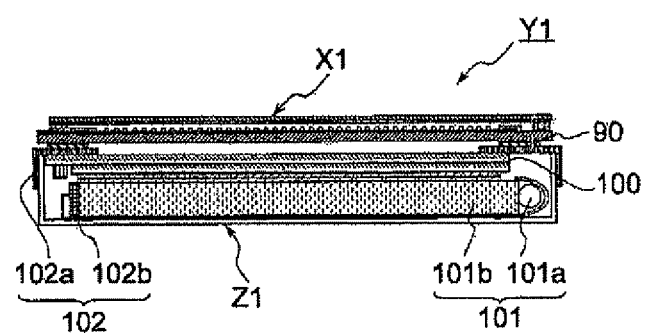
FIG. 8 is a sectional view illustrating one example of a display apparatus according to one embodiment of the present invention.

FIG. 8 is a sectional view illustrating one example of a display apparatus Y1 according to the present embodiment. As illustrated in FIG. 8, the display apparatus Y1 includes the touch panel X1 described above and a liquid crystal display device Z1.

The liquid crystal display device Z1 includes a liquid crystal display panel 100, a backlight 101, and a casing 102.

The backlight 101 includes a light source 101a, and a light guide plate 101b. The light source 101a has a function of emitting light toward the light guide plate 101b, and it is made of an LED (Light Emitting Diode), for example. Instead of the LED, a cold cathode fluorescent lamp (CFL), a halogen lamp, a xenon lamp, or an EL (Electro-Luminescence) may be used. The light guide plate 101b has a function of substantially uniformly guiding the light from the light source 101a over the lower surface of the liquid crystal display panel 100.

The casing 102 has a function of accommodating the liquid crystal display panel 100 and the backlight 101, and has an upper casing 102a and a lower casing 102b. Examples of materials for the casing 102 include a resin or metal such as stainless or aluminum.

The touch panel X1 and the liquid crystal display device Z1 are bonded through a double-faced tape 90. Specifically, the touch panel X1 and the liquid crystal display device Z1 are bonded to each other through the double-faced tape 90 in such a manner that the major surface of the first base 10 or the second base 20 in the touch panel X1 is arranged to opposite the major surface of the liquid crystal display panel 100. A fixing member used for fixing the touch panel X1 and the liquid crystal display device Z1 is not limited to the double-faced tape 90. For example, an adhesive member such as thermosetting resin or ultraviolet curable resin, or a fixing structure for physically fixing the touch panel X1 and the liquid crystal display device Z1 may be used.

As described above, when a user-presses the surface of the touch panel X1 while viewing through the liquid crystal display panel 100 of the liquid crystal display device Z1, the user can input various information. The touch panel X1 may be provided with a function of imparting vibration (a sense of click) to a user who inputs the information, when the user inputs various information. In this case, one or a plurality of piezoelectric devices is provided on the lower surface of the first base 10 in the touch panel X1, for example. When a predetermined load due to the pressing operation is detected, the piezoelectric devices are vibrated in a predetermined frequency, thereby the above-mentioned configuration can be realized.

The above-mentioned display apparatus Y1 is mounted to, for example, various electronic devices such as a portable terminal device such as a cellular phone or PDA (Personal digital Assistant), an electronic notebook, a personal computer, a copying machine, or a terminal device for a game machine.

The above-mentioned embodiment describes that the display panel to which the touch panel X1 is bonded is the liquid crystal display panel 100. However, it is not limited thereto. Specifically, the display panel to which the touch panel X1 is bonded may be a CRT, a plasma display, an organic EL display, an inorganic EL display, an LED display, a fluorescent display tube, a field emission display, or a surface-conduction electron-emitter display and the like.

Second Embodiment

Figure 2:
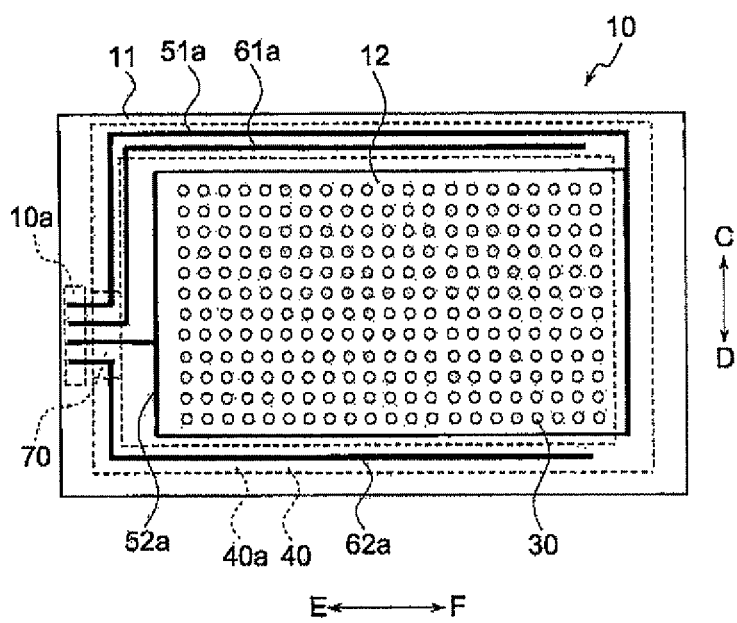
FIG. 2 is a plane view illustrating a schematic configuration of a first base as viewed from an arrow A direction toward an arrow B direction in FIG. 1.
Figure 9:
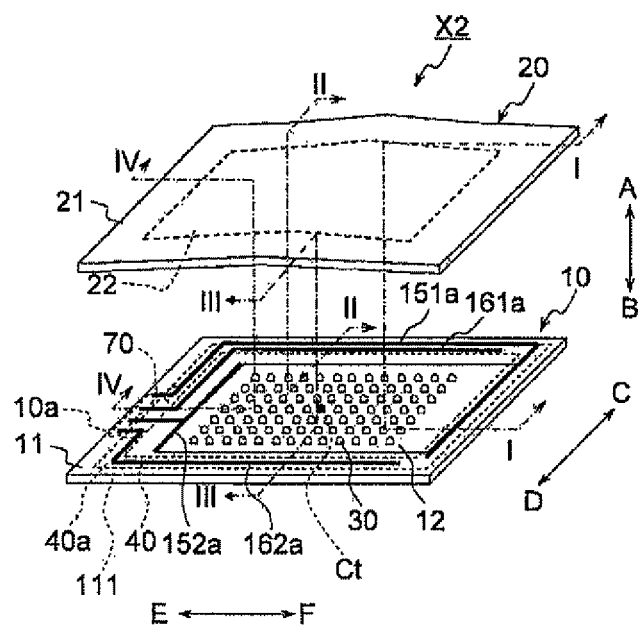
FIG. 9 is an exploded perspective view illustrating one example of a touch panel according to a second embodiment of the present invention.
Figure 10:
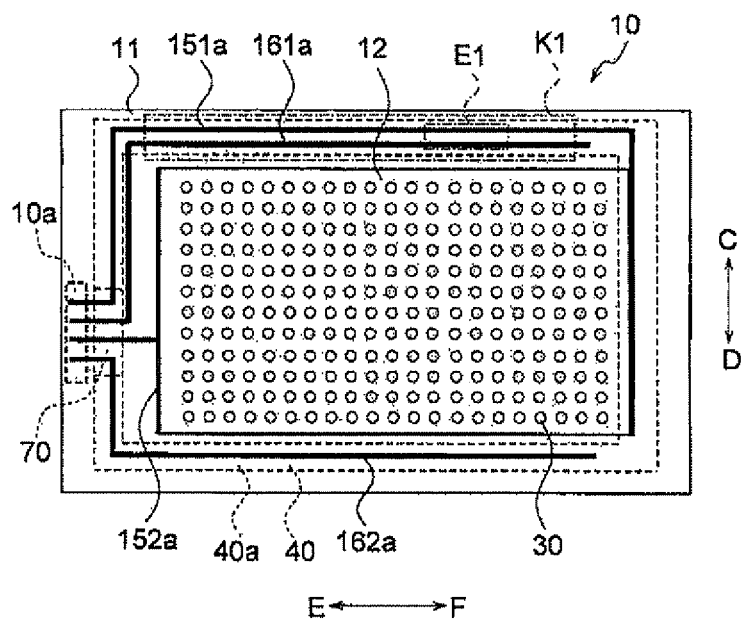
FIG. 10 is a plane view illustrating a schematic configuration of a first base as viewed from an arrow A direction toward an arrow B direction in FIG. 9.
Figure 11:
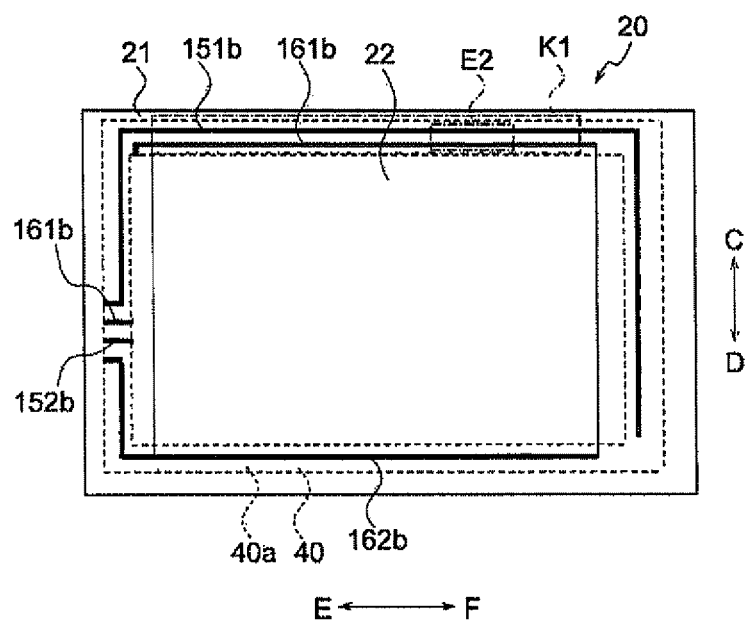
FIG. 11 is a plane view illustrating a schematic configuration of a second base as viewed from the arrow B direction toward the arrow A direction in FIG. 9.

FIG. 9 is an exploded perspective view illustrating one example of a touch panel X2 according to a present embodiment. FIG. 10 is a plane view illustrating a schematic configuration of the first base 10 as viewed from an arrow A direction toward an arrow B direction in FIG. 9. FIG. 11 is a plane view illustrating a schematic configuration of the second base 20 as viewed from the the arrow B direction toward the arrow A direction in FIG. 9. The components in FIGS. 9 to 11 having the functions same as those in FIGS. 1 to 3 are identified by the same numeral and the detailed description will not be repeated.

As illustrated in FIG. 9, in the touch panel X2, the clearance between the first base 10 and the second base 20 is decreased from a center Ct of the first base 10 toward an end 111 of the first base 10 as viewed in a plane. Specifically, in the touch panel X2, the clearance between the first base 10 and the second base 20 at the region where the first detection electrode 12 and the second detection electrode 22 are formed is larger as compared to the touch panel X1. By virtue of this structure, an optical path length in the region where the first detection electrode 12 and the second detection electrode 22 are formed is increased, thereby the occurrence of Newton ring on this region can be suppressed. The occurrence of the Newton ring is suppressed, so that, when the touch panel X2 is provided to the liquid crystal display device Z1, the visibility of the liquid crystal display panel 100 is enhanced. A gas may be injected in the clearance between the first base 10 and the second base 20 at the region where the first detection electrode 12 and the second detection electrode 22 are provided in order to increase the pressure in the clearance, resulting in that the clearance between the first base 10 and the second base 20 can be increased.

In the touch panel X2, first wiring electrodes 151a and 152a, and second wiring electrodes 161a and 162a are provided on the first base 10.

Figure 12:
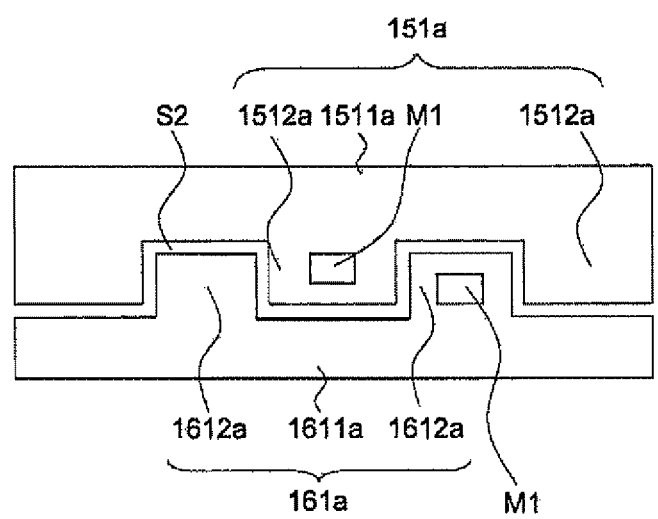
FIG. 12 is an enlarged view of a portion E1 in FIG. 10.

FIG. 12 is an enlarged view of a portion E1 in FIG. 10. As illustrated in FIG. 12, a portion of the first wiring electrode 151a is formed to have a comb-like shape as viewed in a plane. Further, a portion of the second wiring electrode 161a is also formed to have a comb-like shape as viewed in a plane. Specifically, the portion of the first wiring electrode 151a formed to have the comb-like shape includes a trunk wiring 1511a and a plurality of protruding portions 1512a protruding from the trunk wiring 1511a toward inside (toward the first detection electrode 12) of the touch panel X2. The portion of the second wiring electrode 161a formed to have the comb-like shape includes a trunk wiring 1611a and a plurality of protruding portions 1612a protruding from the trunk wiring 1611a toward outside of the touch panel X2. In other word, the first wiring electrode 151a and the second wiring electrode 161a are engaged with each other in such a manner that the protruding portions 1512a of the first wiring electrode 151a and the protruding portions 1612a of the second wiring electrode 161a are alternately arranged via a predetermined gap S2.

In the touch panel X2, first auxiliary electrodes 151b and 152b are mounted on the second base 20 at the portion opposite to the first wiring electrodes 151a and 152a. Second auxiliary electrodes 161b and 162b are also taunted on the second base 20 at the portion opposite to the second wiring electrodes 161a and 162e.

Figure 13:
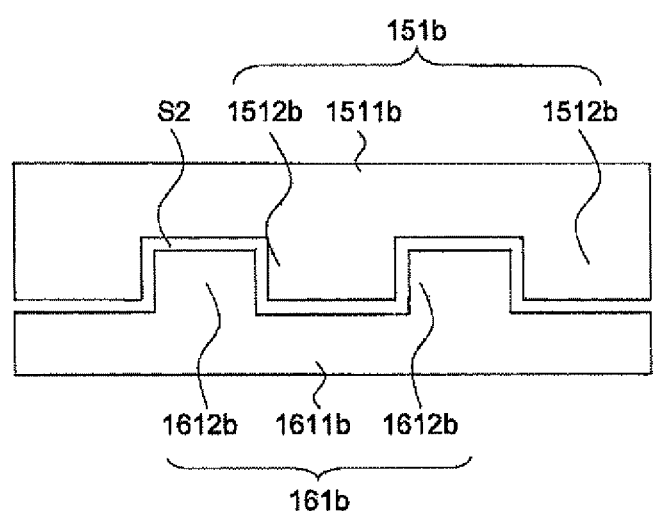
FIG. 13 is an enlarged view of a portion E2 in FIG. 11.

FIG. 13 is an enlarged view of a portion E2 in FIG. 11. As illustrated in FIG. 13, a portion of the first auxiliary electrode 151b is formed to have a comb-like shape as viewed in a plane. Further, a portion of the second auxiliary electrode 161b is also formed to have a comb-like shape as viewed in a plane. Specifically, the portion of the first auxiliary electrode 151b formed to have the comb-like shape includes a trunk wiring 1511b and a plurality of protruding portions 1512b protruding from the trunk wiring 1511b toward inside (toward the second detection electrode 22) of the touch panel X2. The portion of the second auxiliary electrode 16b formed to have the comb-like shape includes a trunk wiring 1611b and a plurality of protruding portions 1612b protruding from the trunk wiring 1611b toward the outside of the touch panel X2. Specifically, the first auxiliary electrode 151b and the second auxiliary electrode 161b are engaged with each other in such a manner that the protruding portions 1512b of the first auxiliary electrode 151b and the protruding portions 1612b of the second auxiliary electrode 161b are alternately arranged via the predetermined gap S2.

In the present embodiment, the first wiring electrode 151a, the second wiring electrode 161a, the first auxiliary electrode 151b, and the second auxiliary electrode 161b are formed into the comb-like shape at the portion of K1 illustrated in FIGS. 10 and 11 as viewed in a plane. The other portions are not formed into the comb-like shape.

The specific shape is not particularly limited, as long as the first wiring electrode 151a, the second wiring electrode 161a, the first auxiliary electrode 151b, and the second auxiliary electrode 161b are formed into the comb-like shape as viewed in a plane view. For example, the protruding portions may be semi-circular or triangle as viewed in a plane view. Even the case in which one protruding portion protruding inward of the touch panel X2 and one protruding portion protruding outward of the touch panel X2 are arranged via the predetermined gap S2 means that "they are engaged with each other".

As described above, since the touch panel X2 is configured such that the first wiring electrode 151a, the second wiring electrode 161a, the first auxiliary electrode 151b, and the second auxiliary electrode 161b are formed into the comb-like shape as viewed in a plane, the following effects can be attained. Specifically, the conductive particles 41 contained in the conductive-adhesive member 40 are deformed (crushed) and the conductive particles 41 are sufficiently made in contact with the second wiring electrode 161a and the second auxiliary electrode 161b, thereby the second wiring electrode 161a and the second auxiliary electrode 161b are electrically connected to each other. Thus, a desired voltage can be applied to the second detection electrode 22 via the second wiring electrode 161a and the second auxiliary electrode 161b, resulting in that the electrical property to the second detection electrode 22 is enhanced.

Specifically, the conductive particles 41 present between the protruding portion 1612a of the second wiring electrode 161a and the protruding portion 1612b of the second auxiliary electrode 161b are easier to be sufficiently deformed than the conductive particles 41 present between the trunk wiring 1611a of the second wiring electrode 161a and the trunk wiring 1611b of the second auxiliary electrode 161b. This is because the protruding portions 1612a and 1612b protrudes outward of the touch panel X2 from the trunk wirings 1611a and 1611b, and the clearance between the first base 10 and the second base 20 is decreased toward the end 111 of the first base 10 from the center Ct of the first base 10 as viewed in a plane. That is to say, this is because the clearance between the first base 10 and the second base 20 at the protruding portions 1612a and 1612b is narrower than the clearance between the first base 10 and the second base 20 at the trunk wirings 1611a and 1611b. Therefore, an electrical conduction can surely be established between the protruding portion 1612a of the second wiring electrode 161a and the protruding portion 1612b of the second auxiliary electrode 161b. Accordingly, the touch panel X2 can enhance the electrical property, while suppressing the occurrence of the Newton ring.

The first wiring electrode 151a and the second wiring electrode 161a are engaged with each other with the predetermined gap S2, and the first auxiliary electrode 151b and the second auxiliary electrode 161b are engaged with each other with the predetermined gap S2. Therefore, the touch panel X2 can be made compact while the resistances of the first wiring electrode 151a and the second wiring electrode 161a being reduced.

A window M1 is preferably provided on at least one of the portion of the first wiring electrode 151e formed into the comb-like shape and the portion of the second wiring electrode 161a formed into the comb-like shape. In the present embodiment, the windows M1 are formed on the protruding portion 1512a of the first wiring electrode 151a and the protruding portion 1612a of the second wiring electrode 161a as illustrated in FIG. 12. With this structure, the degree of deformation (degree of crush) of the conductive particles 41 can visually be confirmed through the window M1. For the touch panel X2 in which the deformation of the conductive particles 41 is not preferred, the presence of this touch panel X2 can be detected before the shipment. Accordingly, the shipment of defective goods can preliminarily be suppressed. The shape of the window M2 is not particularly limited. In the present embodiment, the window M2 is formed into a substantially rectangle shape as viewed in a plane.

The touch panels X1 and X2 are described above as examples of the resistive touch panel, but the it is not limited thereto. Specifically, a capacitance touch panel, a surface acoustic wave touch panel, an infrared touch panel, or an electromagnetic induction type touch panel may be used as the touch panels X1 and X2.

The display apparatus Y1 having the touch panel X1 has been described above. However, instead of the touch panel X1, the touch panel X2 may be employed.

In the touch panels X1 and X2, a film to which an anti-glare process or anti-reflection coating process is applied may further be arranged on at least one of the first base 10 and the second base 20. This structure can reduce reflection of outside light.

The insulating bases 11 and 21 of the touch panels X1 and X2 may be replaced with any one of a phase difference flit, a polarizing film, and a film to which the antiglare process or antireflection coating process is applied.

In other words, the present invention is not limited to the above-mentioned embodiments, but various modifications are possible without departing from the scope of the claims. Specifically, embodiments obtained by combining technical means that are appropriately modified within the scope of the claims are also contained in the technical scope of the present invention.

REFERENCE SIGNS LIST

X1, X2 TOUCH PANEL
Y1 DISPLAY APPARATUS
10 FIRST BASE
12 FIRST DETECTION ELECTRODE
20 SECOND BASE
22 SECOND DETECTION ELECTRODE
40 CONDUCTIVE ADHESIVE MEMBER
51a, 52a FIRST WIRING ELECTRODE (FIRST WIRING.)
151a, 152a FIRST WIRING ELECTRODE (FIRST WIRING)
51b, 52b FIRST AUXILIARY ELECTRODE (FIRST WIRING)
151b, 152b FIRST AUXILIARY ELECTRODE (FIRST WIRING)
61a, 62a SECOND WIRING ELECTRODE (SECOND WIRING)
161a, 162a SECOND WIRING ELECTRODE (SECOND WIRING)
61b, 62b SECOND AUXILIARY ELECTRODE (SECOND WIRING)
161b, 162b SECOND AUXILIARY ELECTRODE (SECOND WIRING)
80 SUPPORT MEMBER
100 LIQUID CRYSTAL DISPLAY PANEL (DISPLAY PANEL)
M1 WINDOW

The invention claimed is:

1. A touch panel comprising:
a first base including a first detection electrode and being transparent to light;
a second base including a second detection electrode that oppose the first detection electrode, and being transparent to light;
a first wiring electrically connected to the first detection electrode; and
a second wiring electrically connected to the second detection electrode, wherein
the first wiring includes:
a first wiring electrode provided on the first base; and
a first auxiliary electrode provided on the second base so as to oppose the first wiring electrode, and
the second wiring includes:
a second wiring electrode provided on the first base; and
a second auxiliary electrode, a portion of the second auxiliary electrode being provided on the second detection electrode of the second base so as to oppose the second wiring electrode,
the first wiring electrode and the first auxiliary electrode are electrically connected to each other via a conductive adhesive member, and
the second wiring electrode and the second auxiliary electrode are electrically connected to each other via a conductive adhesive member.

2. The touch panel according to claim 1, wherein the first auxiliary electrode is provided in a region where the conductive adhesive member is provided and is provided along the entire first wiring electrode located on the region.

3. The touch panel according to claim 1, wherein the first auxiliary electrode is made of a material same as that of the first wiring electrode.

4. The touch panel according to claim 1, wherein the second auxiliary electrode is provided in a region where the conductive adhesive member is provided and is provided along the entire second wiring electrode located on the region.

5. The touch panel according to claim 1, wherein the second auxiliary electrode is made of a material same as that of the second wiring electrode.

6. The touch panel according to claim 1, wherein
a clearance between the first base and the second base decreases from a center of the first base toward an end of the first base as viewed in a plane,
at least a portion of the first wiring electrode and at least a portion of the second wiring electrode are formed into a comb-like shape as viewed in a plane, and
the portion of the first wiring electrode formed into the comb-like shape and the portion of the second wiring electrode formed into the comb-like shape are engaged with each other with a predetermined gap therebetween.

7. The touch panel according to claim 6, wherein the portion of the first auxiliary electrode that opposite the portion of the first wiring electrode formed into the comb-like shape is formed into a comb-like shape as viewed in a plane.

8. The touch panel according to claim 6, wherein the portion of the second auxiliary electrode that opposite the portion of the second wiring electrode formed into the comb-like shape is formed into a comb-like shape.

9. The touch panel according to claim 6, wherein a window is formed on at least one of the portion of the first wiring electrode formed into the comb-like shape and the portion of the second wiring electrode formed into the comb-like shape.

10. The touch panel according to claim 1, wherein a support member is provided between the first base and the second base.

11. The touch panel according to claim 1, wherein the first wiring and the second wiring are made of a thin metal film.

12. The touch panel according to claim 11, wherein the thin metal film is an aluminum film, an aluminum alloy film, a laminated film of a chrome film and an aluminum film, or a laminated film of a chrome film and an aluminum alloy film.

13. A display apparatus comprising:
  the touch panel according to claim 1; and
  a display panel arranged opposite the touch panel.

14. The display apparatus according to claim 13, wherein the display panel is a liquid crystal display panel.

* * * * *